United States Patent [19]

Porsch et al.

[11] 4,196,909
[45] Apr. 8, 1980

[54] PISTON AND SEALING HEAD THEREFOR

[75] Inventors: Bedrich Porsch; Pavel Spacek; Jaroslav Voslar; Stanislav Vozka; Miroslav Kubin, all of Prague, Czechoslovakia

[73] Assignee: Ceskoslovenska akademie ved, Prague, Czechoslovakia

[21] Appl. No.: 928,577

[22] Filed: Jul. 27, 1978

[30] Foreign Application Priority Data

Aug. 5, 1977 [CS] Czechoslovakia ............... 5187-77

[51] Int. Cl.² .................. F16J 15/32; F16J 15/40
[52] U.S. Cl. .......................... 277/27; 277/103; 277/116.6; 277/212 C; 92/245
[58] Field of Search ......... 277/27, 102, 103, 116.6, 277/138, 142, 165, 186, 212 C; 92/245

[56] References Cited

U.S. PATENT DOCUMENTS

| 2,140,778 | 12/1938 | White | 92/245 X |
| 2,895,773 | 7/1959 | McConnaughey | 92/245 |
| 3,874,382 | 4/1975 | Nogier et al. | 92/245 X |

FOREIGN PATENT DOCUMENTS 1180202 10/1964 Fed. Rep. of Germany ....... 277/212 C

*Primary Examiner*—Robert S. Ward, Jr.

[57] ABSTRACT

The invention pertains to the sealing of pistons for pressurizing, pumping and displacing aggressive liquids and organic solvents. The design includes the sealing head proper and its attachment to the piston. Owing to its shape and material it is made of, the sealing head ensures a variable sealing thrust proportional to the pressure acting on the piston, thus enhancing the useful life of the seal.

10 Claims, 3 Drawing Figures

PISTON AND SEALING HEAD THEREFOR

The invention pertains to the sealing of pistons in pressure devices such as pumps (both reciprocating and positive displacement) and compressors. The invention includes a sealing head made of plastics, for example fluoroplasts, polyamides or polypropylene, and also a modified design of the frontal part of the piston.

Pistons in cylinders are usually sealed by means of piston rings made of elastic materials, attached to the rim of the piston. However, the rings are easily corroded and their sealing action is limited by the elasticity of the material they are made of; in addition, their sealing effect does not vary according to the pressure in the cylinder.

Piston cups represent another very often used design; they are made either of elastic materials or of inelastic ones that have a high toughness, such as leather. It is often necessary to enhance their sealing action by supporting elastic elements such as thrust springs or clamping bolts. Piston cups can prove to be insufficient in exacting applications because at the beginning of the working stroke they seal only owing to the elasticity of the cup and/or the supporting elements adjoining the cylinder wall. Moreover, the increase of the sealing effect with increasing back pressure is disproportionally small, as the cups carry only the hydrostatic pressure of the liquid onto the cylinder wall.

The sealing elements for corrosive media are made of fluoroplasts, polyamides or similar plastics, but the relatively low young's modulus of these materials represents a distinct disadvantage. Designs that make use of additional supporting elastic elements are complicated in this case by the low creep strength of these plastics, which in turn leads to a short useful life of the seal.

It is the aim of the present invention to overcome these drawbacks by a design of a corrosion-resistant seal with a long useful life, that shows a variable sealing thrust depending on the back pressure in the cylinder.

This aim was achieved by the new design of both the sealing head and the piston according to this invention. Its essence rests in that the sealing head covers both the face and the frontal sides of the piston, and that a cavity having the shape of a planoconvex lens is formed, under conditions of zero load, between the face of the piston and the frontal part of the sealing head; the outer circumference of this frontal part is at least equal to the inner circumference of the sealed cylinder. In addition, the frontal sides of the piston are provided with recesses that serve for the attachment of the sealing head. It is of advantage if the outer circumference of the frontal part of the sealing head is from 0.1 to 5 percent larger than the inner circumference of the cylinder. The cavity between the piston face and the sealing head can be filled with some elastic organic material. The frontal part of the sealing head is usually thicker in its central region than at the periphery. A recess in the side wall of the piston and a collar on the corresponding opposite side wall of the sealing head can serve for the attachment of the latter to the piston. Alternatively, the sealing head can be attached also by means of threads on the reduced rim of the frontal part of the piston and on the inner side wall of the sealing head. Still another possibility of attachment is formation of a recess in the piston face (shaped in such a manner that its diameter increases towards the sealing head is the larger of the two) with a screw head positioned within the recess, whose shape and dimensions are identical with those of the inner side wall of the sealing head.

As soon as the liquid in the cylinder is compressed, a certain fraction of the total force acting on the convex face of the sealing head is carried to the sealing wall of the head; this fact is at least partially attributable to the sealing head being made of plastics. It has been proved experimentally that the pressure in the cylinder, acting on the convex frontal part of the sealing head, leads to a sufficient inward bending of this frontal part, so that its rim is pressed against the cylinder wall. The sealing thrust involved is sufficiently high and remains always proportional to the pressure. This fact, viz., that the sealing surfaces of the sealing head are pushed against the cylinder wall by a force that is variable and proportional to the pressure inside of the cylinder, leads to an enhanced useful life of the seal in comparison with other designs that utilize additional elastic elements, owing to the diminished danger of seal failure brought about by permanent deformation under load. For the same reason, plastics with a low creep strength can be used in manufacturing the sealing head according to this invention; these materials could not be employed in other designs just because of their low cold creep strength. Another advantage of the seal according to this invention is the possibility to seal the piston also under condition of zero pressure only by the necessary force, so that the material of the seal is not subject to an extensive load. It is thus possible, by choosing judiciously the ratio of the outer circumference of the sealing head to the inner circumference of the cylinder, to prevent the load approaching the cold creep strength of the plastics in question.

The design of the piston seal according to this invention is illustrated in the drawings.

Figure 1:
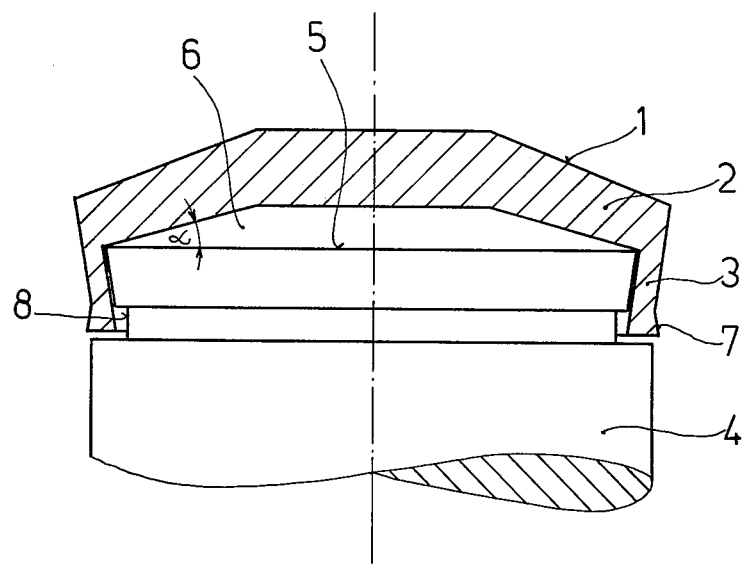
FIG. 1 shows the sealing head attached to the piston by means of the collar on the side wall of the sealing head and the corresponding recess in the piston.

As the first Example, the sealing head was manufactured from polytetrafluoroethylene according to FIG. 1. The sealing head 1 consists of the frontal part 2 and the side wall 3, so that it can be fitted onto the front part of the piston 4 machined from stainless steel. The frontal part 2 of the sealing head 1 is convex. The cavity 6 between the face 5 of the piston 4 and the frontal part 2 of the sealing head 1 has the shape of a planoconvex lens, so that the distance between the sealing head 1 and the piston 4 is the greatest in the center of the face 5 of the piston 4, and diminishes towards the perimeter of the piston 4 within the range of the angle $\alpha = 3°$ to $45°$; the choice $\alpha = 15°$ proved to be of advantage. The convex shape can be round or angular. The thickness of the convex frontal part 2 can be uniform when intended for use with lower pressures or, for higher pressures, it can be made thicker in the central region. This thickening can be such that in the central region a round plate of constant thickness is formed as shown in FIG. 1. The side wall 3 of the sealing head 1 (and also the mating side wall of the piston) can be cylindrical or conical. The protruding collar 7 is formed at the rear end of the side wall 3; accordingly, the lower rim of the side wall 3 is pressed into the recess 8 machined in the piston 4 as soon as the piston is introduced into the cylinder. The everyday performance of the sealing head according to FIG. 1 was tested in a long-term experiment under pressures of up to 50 MPa.

Figure 2:
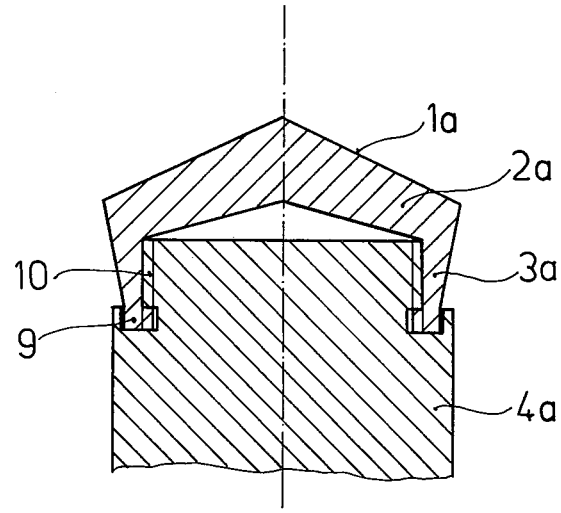
FIG. 2 shows the attachment of the sealing head by means of threads on the sealing head and on the piston. An alternative attachment of the sealing head by means of a screw head positioned inside of a recess formed in the piston is shown in FIG. 3.

The sealing head according to FIG. 2 was manufactured from polyamide; the central region of the frontal part 2 was thickened to have the conical shape shown in the Figure. The outer surface of side wall 3a was conical with a cylindrical lower rim which bore on the recess 9. The cylindrical inner surface of side wall 3a was provided with the thread 10; the frontal part of the piston 4 was also provided with the thread 10. The seal was tested with pressures of up to 20 MPa.

Figure 3:
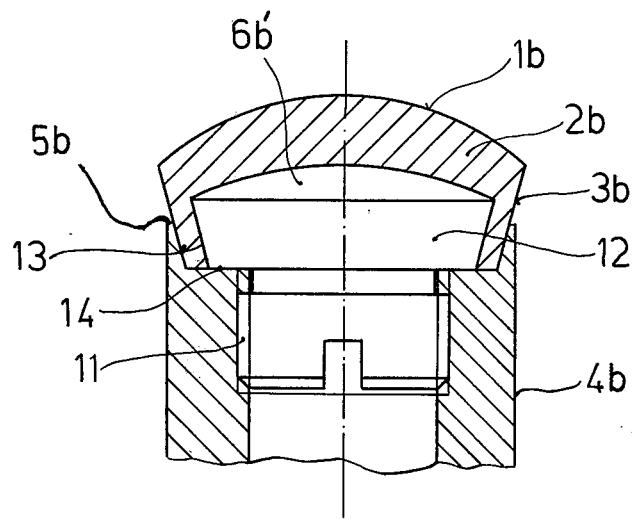

The seal shown in FIG. 3 is formed by the sealing head 1b made of polypropylene. The convex frontal part 2b has a round shape and its thickness is the highest in the central region and diminishes towards the periphery. The cavity 6 below the frontal part 2b has the shape typical of a planoconvex lens. The face 5b of the piston 4b is provided with the inner recess 14 which extends to the outer side wall of the piston. The inner wall 13 of this recess 14 is chamferred so that its upper diameter is larger than the lower. The side wall 3b of the sealing head 1b is conical with the same taper ratio as that of the inner wall 13 of the recess 14. The piston proper is hollow and is provided with an inner thread 11, so that the screw 12 can be screwed into position until its head bears on the bottom of the recess 14. The taper ratio of the head of side wall of the screw 12 is the same as that of the inner surface of side wall 3b of the sealing head 1b. This design guarantees a good attachment of the sealing head 1b without any danger of its slipping off the piston during the intake stroke. This seal arrangement was tested successfully up to a pressure of 20 MPa.

The cavity is an essential feature of the sealing head described; the cavity permits the frontal part of the sealing head to bend towards the piston during the working stroke, thus increasing the thrust on the side wall. On the other hand, during the intake stroke of the piston the convex frontal part of the sealing head recovers the original shape and its thrust on the side wall diminishes, so that the useful life of the sealing head is prolonged. In order to facilitate this recovery of the original shape of the frontal part of the sealing head, the cavity can be filled with an elastic material such as a gas, plastics, rubber and the like, for use at higher pressures.

Equally important is the shape and material of the sealing head. The shape has been already described in detail. The sealing head is made of elastic material and must have a low creep strength. Elastic polymeric materials are used; fluoroplasts, nylon and polypropylene proved to be the most suitable, as they have high corrosion resistance and can be used both in very aggressive media and in organic solvents. Rubber can be utilized only for a limited number of liquids.

We claim:

1. A piston and sealing head therefor for use in pumping corrosive liquids comprising a piston terminating at one end thereof in a transversely extending end face and a sealing head formed of a flexible elastic polymeric organic material positioned over said one end of said piston, said sealing head including a transversely extending frontal portion and a side wall tapering outwardly in the direction of said frontal portion, said sidewall being cooperable with the contiguous side wall of said piston to retain the sealing head thereon, a generally planoconvex cavity being formed between said end face of the piston and the overlying frontal portion of said sealing head the frontal portion and sidewall of said sealing head being so proportioned as to result in axial depression of said frontal portion and outward radial movement of said sidewalls into area sealing relationship with the contiguous inner surfaces of the pressure device within which the piston and sealing head are positioned under pressure conditions and in the return of the sealing head to substantially its initial shape under no load conditions within the pressure device.

2. A piston and sealing head according to claim 1, wherein the outer circumference of the frontal portion of the sealing head is from 0.1 to 5 percent greater than the inner circumference of a cylinder within which said piston is to be positioned.

3. A piston and sealing head according to claim 1, wherein said cavity is filled with a gaseous material.

4. A piston and sealing head according to claim 1, wherein the central region of the frontal portion of the sealing head is thicker than its peripheral region.

5. A piston and sealing head according to claim 1 including a recess formed in said side wall of the piston and a collar formed on the corresponding opposite surface of the side wall of the sealing head.

6. A piston and sealing head according to claim 1, wherein the corresponding sidewalls of said piston and sealing head are provided with cooperable threads.

7. A piston and sealing head according to claim 1, including an axially extending tapered recess formed centrally of said piston at said one end thereof, the diameter of said recess nearest to the sealing head being greatest, and a screw having a head with a shape and dimension substantially identical with those of the inner surface of the side wall of the sealing head positioned within said recess.

8. A piston and sealing head according to claim 1, wherein the sealing head is made of an elastic polymeric organic material.

9. A piston and sealing head according to claim 1, wherein said cavity is filled with an elastic compressible material other than that of said sealing head.

10. A piston and sealing head according to claim 1 wherein said organic polymeric material is selected from the group consisting of fluoroplastics, polyamides and polypropylenes.

* * * * *